R. G. A. DUTERT.
AUTOMATIC FOCUSING DEVICE FOR COPYING OR ENLARGING CAMERAS AND THE LIKE.
APPLICATION FILED JUNE 10, 1912.
1,211,302.
Patented Jan. 2, 1917.
2 SHEETS—SHEET 1.
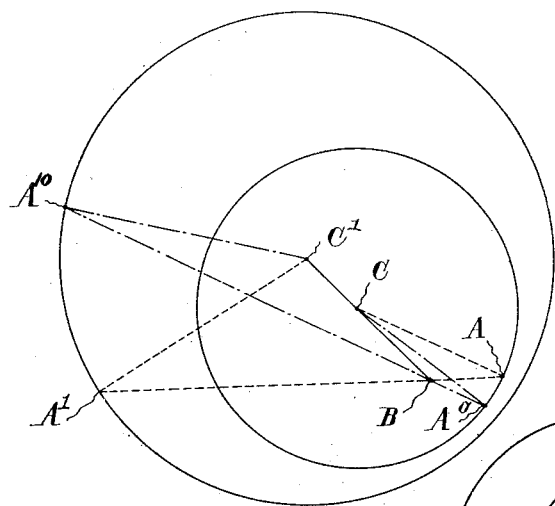
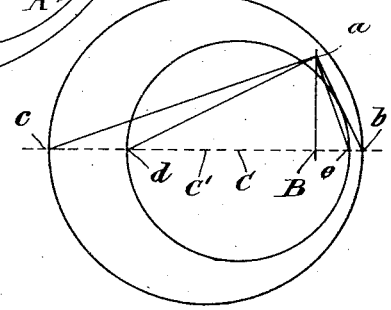
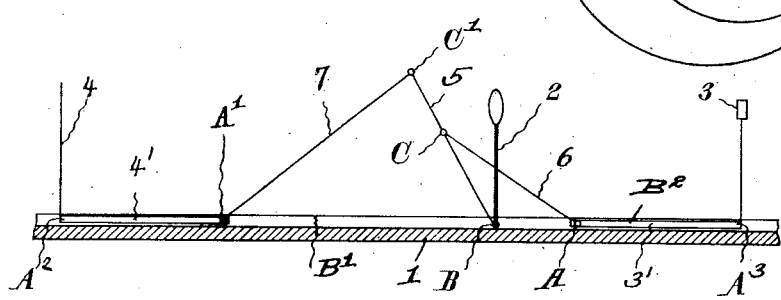

R. G. A. DUTERT.
AUTOMATIC FOCUSING DEVICE FOR COPYING OR ENLARGING CAMERAS AND THE LIKE.
APPLICATION FILED JUNE 10, 1912.

1,211,302.

Patented Jan. 2, 1917.

UNITED STATES PATENT OFFICE.

RENÉ GUSTAVE ARTHUR DUTERT, OF PARIS, FRANCE.

AUTOMATIC FOCUSING DEVICE FOR COPYING OR ENLARGING CAMERAS AND THE LIKE.

1,211,302.  Specification of Letters Patent.  Patented Jan. 2, 1917.

Application filed June 10, 1912. Serial No. 702,879.

*To all whom it may concern:*

Be it known that I, RENÉ GUSTAVE ARTHUR DUTERT, a citizen of the French Republic, residing in Paris, France, have invented certain new and useful Improvements in Automatic Focusing Devices for Copying or Enlarging Cameras and the like, of which the following is a specification.

This invention relates to an apparatus by which two points are to be connected in such a manner that the product of their respective distances either from one or from two other points is constant, and the invention also relates to apparatus such as photographic cameras and more particularly to enlarging apparatus.

According to this invention the two points to be connected, are joined together and to the third point from which the correlated distances are to be measured, by a system of pivoted links so arranged that when the whole arrangement is rotated relatively to one of the said links, the two points are constrained to describe circumferences inverted relatively to each other with reference to the said third point.

The invention will be clearly understood from the following description and the accompanying drawings, given by way of example.

Figure 3:
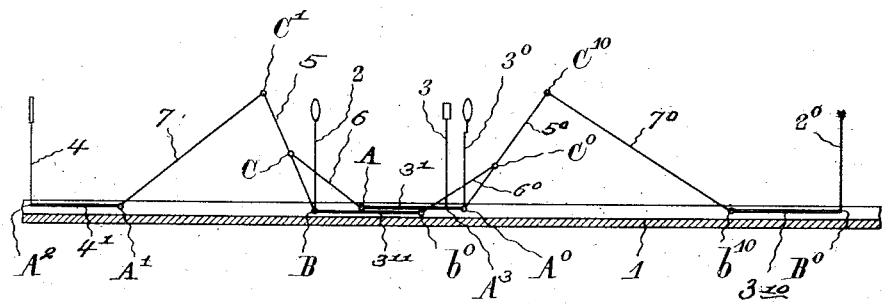
Figure 4:
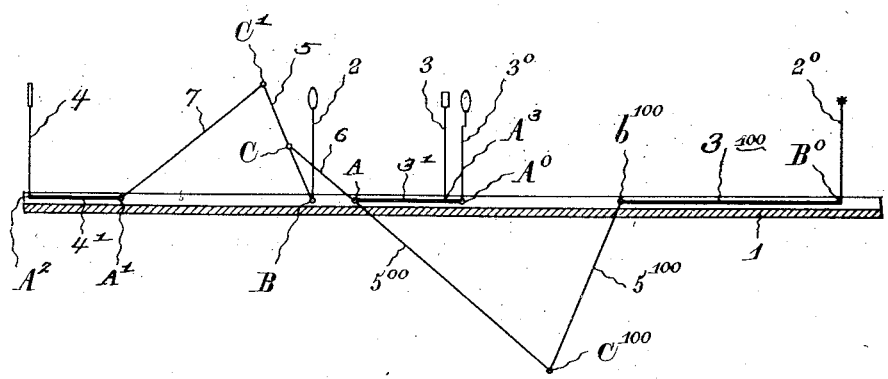

Figure 1 of the said drawings is a geometrical figure illustrating the principle on which the invention is based. Fig. 2 is a view showing diagrammatically in elevation an apparatus built in accordance with this invention. Figs. 3 and 4 are similar diagrammatic views of an apparatus equipped with a condenser and source of light and with a second link system; and Fig. 5 is an explanatory diagram.

Referring to Fig. 1, the two points to be connected are designated A and $A^1$, and the third point is marked B. It will be seen, from the theory of circumferences inverted relatively to one and the same point, that if the straight line connecting the two points A, $A^1$ to be connected is rotated about the third point B so that, (given that the distance of the first point A from the third B is variable only between two non-infinite limits), the said first point describes such a circumference having a center C that the longest and shortest distances of the point B from the said circumference are respectively equal to the said limits, then the second point $A^1$ will simultaneously describe another circumference, the center $C^1$ of which is on the straight line connecting the center of the preceding circumference to the point B.

The link system comprises three rods, 5, 6 and 7, and a base 1 formed with a guide. The lower end B of the rod 5 is pivoted in the guide, and corresponds to the fixed point B, Fig. 1, which is of course the "third point". The lower ends of the rods 6 and 7 (A and $A^1$ respectively), slide in the guide, and constitute the two points to be connected. At their upper ends they are pivoted to the rod 5 at C and $C^1$ respectively, the distances $A^1 C^1$, $C C^1$, B C, and A C being the same as in Fig. 1. Thus it will be seen that the two points A $A^1$ are constrained to move so that they actually describe the inverted circles of Fig. 1 relatively to the two points C and $C^1$, although in practice the base is of course fixed, and the points C $C^1$ move. If the distances, the product of which is to remain constant, are measured from the two movable points to two fixed points, such as $B^1$ and $B^2$, instead of to a single point such as B, then the points $A^1$ and A are pivoted to two slides $4^1$ and $3^1$, respectively, moving in the guide, and equal in length to the distances B $B^1$, and B $B^2$, respectively. It will readily be seen that the distance between the points $A^2$ and $B^1$ will always be equal to the distance $A^1$ B, and similarly the distance $A^3$ $B^2$ will always be equal to the distance A B, so that the two points $A^2$ and $A^3$ will always move so that the product of their distances from two fixed points $B^1$ and $B^2$ is constant.

In the case of a photographic enlarging camera, the conditions mentioned in the last instance must be fulfilled, because in apparatus of this kind, the negative and the sensitized surface must be combined in such a manner relatively to the focal points of the lens that the product of the respective distances of the said object and surface from the said points is constant.

In Fig. 2, the arrangement of an enlarging camera is shown diagrammatically. The points $B^1$ and $B^2$ represent projections of the foci of the lens 2, which is fixed to the base 1 in the guide. The negative-carrier 3 is fixed to the slide $3^1$ at the point $A^2$, and the holder 4 for the sensitized surface or print is fixed to the slide 4' at the point A². The distance B¹ B² is shown very much exaggerated for the sake of clearness.

In order to describe the two circumferences inverted relatively to a point B, a circle is described with center C¹ and radius such that the length B$c$ is equal to the larger and the length to B$e$ the smaller of the two limits of length described above. (See Fig. 5.) The constant product of the two distances is then determined, (this product being equal to the square of the focal length of the lens, as will be understood by those skilled in optics), and a line B$a$ is drawn, (Fig. 5), perpendicular to the diameter $b\ c$, and of a length equal to the square root of the constant product. The line $a\ d$ is drawn perpendicular to $a\ b$, and the line $a\ e$ perpendicular to $a\ c$; the line $d\ e$ represents the diameter of the required inverse circumference, and $$B c \times B e = a B^2.$$

When the negative, in the case of an enlarging camera, is illuminated by a source of artificial light and a condenser, the lens, the condenser and the source of light are connected in the same manner as the negative, the lens and the receiving or sensitized surface of the print in the holder, so that the light passing through the condenser is always brought to a focus within the lens. The system of links by which the connection is effected is also interconnected with the first-described system, so that the light, the condenser, the negative, the lens and the receiving surface all move so as to be always at their proper relative distances. Constructions of this character are illustrated in Figs. 3 and 4, the former construction embodying, in addition to a link system and a pair of slides identical with those shown in Fig. 2 and similarly designated, a second link system, consisting of the rods 5°, 6° and 7°, a supplemental slide 3¹⁰ and a stationary member 3¹¹. The slide 3¹⁰ has mounted thereon at the end B° the source of light 2°, and the other end $b^{10}$ of this slide is pivotally connected to the lower end of the rod 7°, which latter is similarly connected at its upper end C¹⁰ to the upper end of the rod 5°. The lower end A° of the rod 5° is pivotally connected to the adjacent end of the slide 3¹ associated with the first system, the opposite end A of the said slide being pivotally connected to the lower end of the rod 6, and this slide bears the negative carrier 3 and, also, the condenser 3°, which are mounted thereon at the points A³ and A°, respectively. The upper end of the rod 6° is pivotally connected to the rod 5° at the point C°, and its lower end to the adjacent end $b°$ of the stationary member 3¹¹. The aforementioned condenser 3° is, therefore, located, beyond the negative carrier 3, and the source of light 2° beyond the said condenser.

In the construction shown in Fig. 4, a supplemental side 3¹⁰⁰, bearing the source of light 2°, is substituted for the previously used slides 3¹⁰ and 3¹¹, and the end $b^{100}$ of this slide has pivotally connected to it the upper end of the depending rod 5¹⁰⁰, the lower end C¹⁰⁰ of which is pivotally connected to that of the rod 5°°. The slide 3¹ bears the negative carrier 3 and condenser 3°, as before, at corresponding points, and its end A has pivotally connected to it the upper end of the rod 5°° and the lower end of the rod 6.

The arrangement of the various parts is such that the front nodal point of the condenser 3°, (i. e., that one of the nodal points which is the nearer to the print holder), is in the same transverse, vertical plane as the point A°, and the slide 3¹¹, (Fig. 3), has a length equal to the focal distance of the said condenser, while that of the slide 3¹⁰ is equal to such focal distance plus the distance of the said nodal points. In the other construction, (Fig. 4), the condenser has a definite, predetermined focal distance equal to that between the points A° A, and the slide 3¹⁰⁰ has a length equal to twice such focal distance plus the distance of the nodal points.

Having now particularly described and ascertained the nature of my said invention and in what manner the same is to be performed, I declare that what I claim is:—

1. In an optical apparatus of the character specified, the combination, with a base, and a pair of longitudinally-movable slides mounted thereon; of a three-part link system for shifting said slides, one member of which system is pivoted to said base and the other two members to said slides and to the first mentioned member at different points in its length, the pivot point of the first-named member being so related to the pivot points of the second-named members that the product of the respective distances of the second-named points from the first-named point is constant.

2. In an optical apparatus of the character specified, the combination, with a base, and a pair of longitudinally-movable slides mounted thereon; of a link system comprising three inter-connected rods pivoted at their lower ends one to said base and the other two to said slides and to different points in the length of the rod first mentioned, the pivot point of the first-named rod being so disposed relative to the pivot points of the second-named rods that the product of the respective distances of the second-named points from the first-named point is constant; a lens connected to said base above and directly in line with the said first-named point; an object holder carried by one of the said slides; and a receiving surface carried by the other slide, the product of the distances between the object holder and one of the foci of the lens and between the other focus of the lens and the receiving surface being equal to the square of the focus of the said lens.

3. In an optical apparatus of the character specified, the combination, with a base, and a pair of longitudinally-movable slides mounted thereon; of a link system comprising three inter-connected rods pivoted one to said base and the other two to said slides, the pivot point of the first-named rod being so disposed relative to the pivot points of the second-named rods that the product of the respective distances of the second-named points from the first-named point is constant; a lens connected to said base above and directly in line with the first-named point; an object holder carried by one of the said slides; a receiving surface carried by the other slide, the product of the distances between the object holder and one of the foci of the lens and between the other focus of the lens and the receiving surface being equal to the square of the focus of the said lens; and focusing means for a condenser and a source of light embodying a second link system comprising a plurality of inter-connected rods one of which is connected to the slide which carries the said object holder; a condenser mounted on that slide; and a third slide mounted on said base for longitudinal movement and carrying a source of light, the said third slide having one of the rods of the second-named link system connected thereto, said rods coöperating to maintain constant the product of the respective distances of the source of light and the lens from the foci of the condenser.

In testimony whereof I have signed my name to this specification in the presence of two subscribing witnesses.

RENÉ GUSTAVE ARTHUR DUTERT.

Witnesses:
 H. C. COXE,
 PAUL BLUM.